United States Patent
Rao

(10) Patent No.: US 9,137,284 B1
(45) Date of Patent: *Sep. 15, 2015

(54) METHOD AND APPARATUS FOR DETECTING AND INDICATING PACKETS CONTAINING VOICE ACTIVITY IN THE TRANSMISSION OF VOICE OVER A PACKET DATA NETWORK

(71) Applicant: Marvell International Ltd., Hamilton (BM)

(72) Inventor: Chandrashekhar Rao, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 31 days.

This patent is subject to a terminal disclaimer.

(21) Appl. No.: 14/072,204

(22) Filed: Nov. 5, 2013

Related U.S. Application Data

(63) Continuation of application No. 12/625,988, filed on Nov. 25, 2009, now Pat. No. 8,576,837.

(60) Provisional application No. 61/145,850, filed on Jan. 20, 2009.

(51) Int. Cl.
H04L 29/06 (2006.01)

(52) U.S. Cl.
CPC ............ *H04L 65/607* (2013.01); *H04L 65/608* (2013.01)

(58) Field of Classification Search
CPC ................ A61B 5/02; A63F 2300/201; A63F 2300/406; A63F 2300/8023; G10L 21/0208; G10L 25/78; G10L 25/84; G10L 2021/02165; H04R 3/005

See application file for complete search history.

(56) References Cited

U.S. PATENT DOCUMENTS

| | | | |
|---|---|---|---|
| 5,991,725 A * | 11/1999 | Asghar et al. ................ | 704/270 |
| 2003/0018480 A1 * | 1/2003 | Mecayten ..................... | 704/277 |
| 2005/0182620 A1 * | 8/2005 | Kabi et al. .................... | 704/216 |
| 2006/0072576 A1 * | 4/2006 | Miao et al. .................... | 370/394 |

* cited by examiner

*Primary Examiner* — Yong Zhou

(57) ABSTRACT

A network device includes a receiving device, a detector, and a circuit. The receiving device receives a first signal. The first signal includes first and second packets. The first packets correspond to intervals of the first signal containing voice activity. The second packets correspond to intervals of the first signal not containing voice activity. The detector detects the first packets and generates an indication signal identifying the first packets. The circuit, based on the indication signal, inserts a bit in either each of the first packets and not the second packets or each of the second packets and not the first packets. The bit inserted into each of the first packets or the second packets indicates which of the packets in the first signal correspond to intervals of the first signal containing voice activity.

24 Claims, 6 Drawing Sheets

METHOD AND APPARATUS FOR DETECTING AND INDICATING PACKETS CONTAINING VOICE ACTIVITY IN THE TRANSMISSION OF VOICE OVER A PACKET DATA NETWORK

CROSS-REFERENCE TO RELATED APPLICATIONS

The present disclosure is a continuation of U.S. patent application Ser. No. 12/625,988 (now U.S. Pat. No. 8,576, 837). This application claims the benefit of U.S. Provisional Patent Application Ser. No. 61/145,850, filed on Jan. 20, 2009. The entire disclosures of the applications referenced above are incorporated herein by reference.

FIELD

The present disclosure relates generally to the transmission of voice over packet data networks. More particularly, the present disclosure relates to the use of packet redundancy based on voice activity to improve the quality of the voice transmission.

BACKGROUND

Voice transmission increasingly relies on the use of packet data networks. Technologies such as VOIP have helped to popularize this method of voice transmission. However, packet networks are subject to packet loss. For non-real-time data, lost packets can be detected and retransmitted to complete the data set at the receiving end. But with real-time data such as voice data, retransmission is not a viable option because, by the time a lost packet is detected and retransmitted, it is too late for the packet to take its place in the stream of packets at the receiver.

SUMMARY

A network device is provided and includes a receiving device, a detector, and a circuit. The receiving device is configured to receive a first signal. The first signal includes first packets and second packets. The first packets correspond to intervals of the first signal containing voice activity. The second packets correspond to intervals of the first signal not containing voice activity. The detector is configured to (i) detect the first packets that correspond to the intervals of the first signal containing the voice activity, and (ii) generate an indication signal identifying the first packets that correspond to the intervals of the first signal containing the voice activity. The circuit is configured to, based on the indication signal, insert a bit in either (i) each of the first packets and not the second packets, or (ii) each of the second packets and not the first packets. The bit inserted into each of the first packets or the second packets indicate which of the packets in the first signal correspond to intervals of the first signal containing voice activity.

In other features, a method is provided and includes receiving a first signal. The first signal includes first packets and second packets. The first packets correspond to intervals of the first signal containing voice activity. The second packets correspond to intervals of the first signal not containing voice activity. The method further includes: detecting the first packets in the first signal that correspond to the intervals of the first signal containing the voice activity; and generating an indication signal identifying the first packets that correspond to the intervals of the first signal containing the voice activity.

The method further includes, based on the indication signal, inserting a bit in either (i) each of the first packets and not the second packets, or (ii) each of the second packets and not the first packets. The bit inserted into each of the first packets or the second packets indicate which of the packets in the first signal correspond to intervals of the first signal containing voice activity.

In other features a network device is provided and includes a receiving device, a detector, and a circuit. The receiving device is configured to receive a first signal. The first signal includes packets. The packets include first packets and second packets. The first packets correspond to intervals of the first signal with voice data. The second packets correspond to intervals of the first signal without voice data. The detector is configured to (i) detect which of the packets in the first signal include the voice data, and (ii) generate an indication signal identifying the first packets as packets with the voice data. The circuit is configured to, based on the indication signal, insert a bit in either (i) each of the first packets and not the second packets, or (ii) each of the second packets and not the first packets. The bits indicate which of the packets include the voice data.

In general, in one aspect, an embodiment features an apparatus including: an input circuit configured to receive packets of encoded voice data, where the encoded voice data includes intervals of voice activity and intervals of silence, and where each of the packets includes a packet sequence indicator; and a first packet circuit configured to transmit two or more of each packet that includes one or more of the intervals of voice activity, and configured to transmit only one of each packet that includes only intervals of silence.

In general, in one aspect, an embodiment features a method including: receiving packets of encoded voice data, where the encoded voice data includes intervals of voice activity and intervals of silence, and where each of the first packets includes a packet sequence indicator; transmitting two or more of each packet that includes one or more of the intervals of voice activity; and transmitting only one of each packet that includes only intervals of silence.

In general, in one aspect, an embodiment features a computer program including: instructions for receiving packets of encoded voice data, where the encoded voice data includes intervals of voice activity and intervals of silence, and where each of the first packets includes a packet sequence indicator; instructions for transmitting two or more of each packet that includes one or more of the intervals of voice activity; and instructions for transmitting only one of each packet that includes only intervals of silence.

The details of one or more implementations are set forth in the accompanying drawings and the description below. Other features will be apparent from the description and drawings, and from the claims.

BRIEF DESCRIPTION OF DRAWINGS

FIG. 4 shows an embodiment including a codec that does not support voice activity detection.

FIG. 5 shows an embodiment including a codec that supports voice activity detection.

FIG. 6 shows an embodiment including a codec that supports voice activity detection and places voice activity flags in RTP packet headers.

Figure 1:
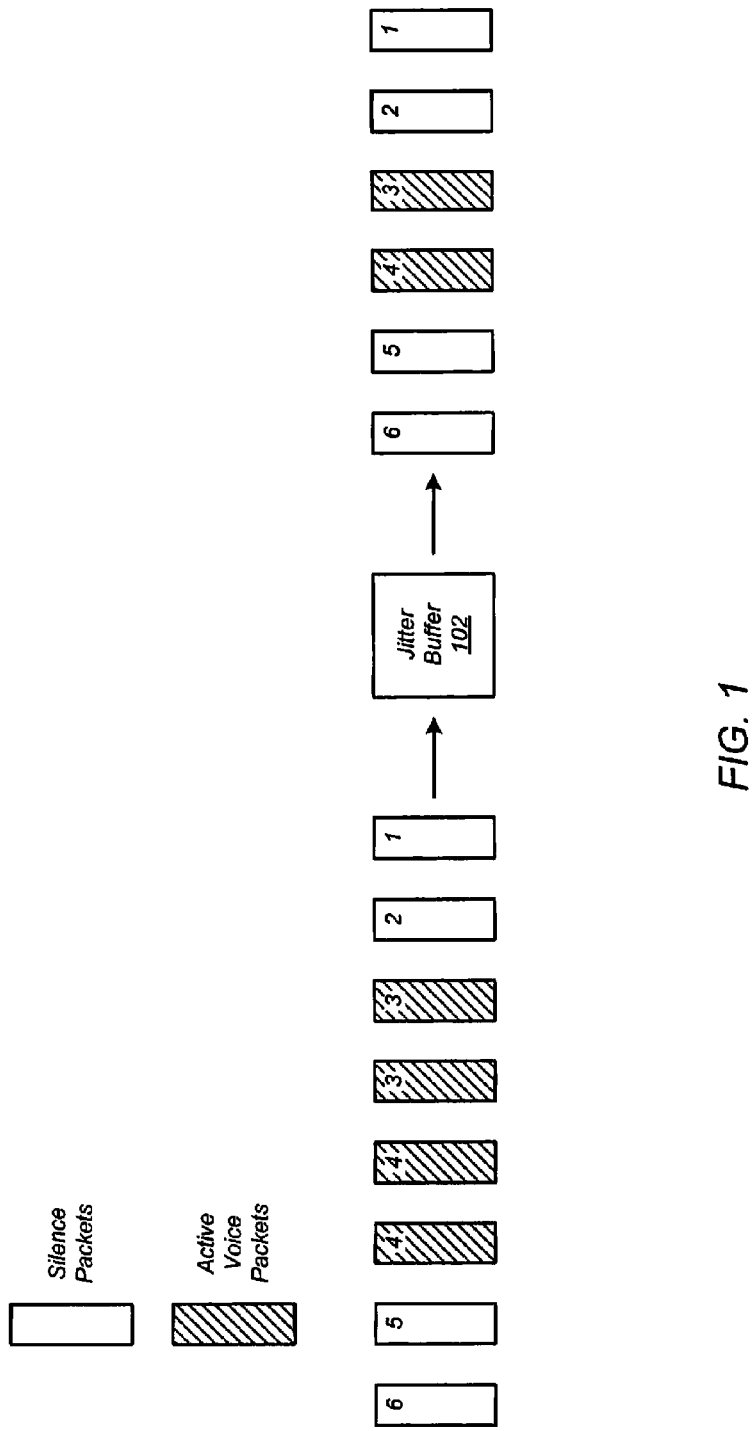
FIG. 1 graphically illustrates operation of some embodiments.

The leading digit(s) of each reference numeral used in this specification indicates the number of the drawing in which the reference numeral first appears.

DESCRIPTION

Embodiments of the present disclosure employ packet redundancy based on voice activity to improve the quality of voice transmission over packet data networks. However, while the disclosed embodiments are described with reference to voice communications, the principles and techniques are readily extended to other sorts of real-time communications.

Statistics show that the normal conversational voice is active approximately 50% of the time. Voice data therefore generally include intervals of silence and intervals of voice activity. The described embodiments employ a voice activity detection module to detect voice activity in the voice packets. Voice activity detection modules are readily available, and are even integrated with some current codecs, where the codec provides voice activity information. The described embodiments employ packet redundancy for the active voice packets. That is, two or more of each active voice packet are transmitted over the network. Only one of each of the remaining "silence" packets is transmitted. FIG. 1 graphically illustrates this technique.

Referring to FIG. 1, voice packets are shown as rectangles with sequence numbers indicating the sequence of transmission of the packets. Active voice packets are shown as crosshatched, while silence packets are not. In the example of FIG. 1, one of each silence packet (packets 1, 2, 5 and 6) has been transmitted, while two of each active voice packet (packets 3 and 4) have been transmitted. A conventional jitter buffer 102 receives the packets. Jitter buffer 102 discards any redundant packets, so that only one copy of each packet is kept, as shown in FIG. 1. This technique increases the reliability of the voice transmission because it is unlikely that both copies of an active voice packet will be lost. In addition, bandwidth is conserved by transmitting only one of each silence packet. This is acceptable as the loss of a silence packet will not adversely affect the quality of the received voice transmission. In some implementations, the reliability of the voice transmission can be increased further by transmitting more that two copies of each active voice packet.

Figure 2:
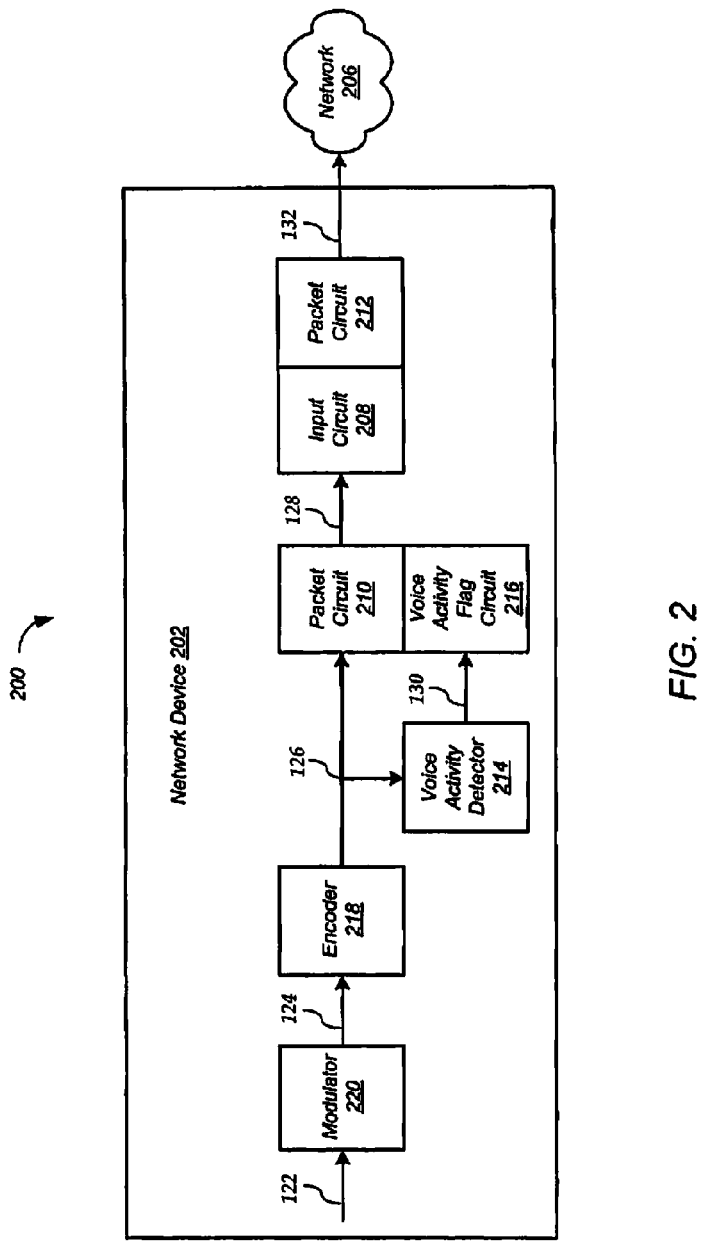
FIG. 2 shows elements of a voice communication system including a network device in communication with a network according to some embodiments.

FIG. 2 shows elements of a voice communication system 200 including a network device 202 in communication with a network 206 according to some embodiments. Although in the described embodiments, the elements of network device 202 are presented in one arrangement, other embodiments may feature other arrangements. For example, elements of network device 202 can be implemented in hardware, software, or combinations thereof.

Referring to FIG. 2, network device 202 can be implemented as a switch, router, network interface controller (NIC), and the like. Network 206 can be implemented as a wide-area network such as the Internet, a local-area network (LAN), wireless networks such as Wireless LANs, Worldwide Interoperability for Microwave Access (WiMAX), Long Term Evolution (LTE) and the like. While various embodiments are described with respect to network communications, they are also applicable to devices employing other forms of data communications such as direct links and the like. Network device 202 includes an input circuit 208, packet circuits 210 and 212, a voice activity detector 214, a voice activity flag circuit 216, an encoder 218, and a modulator 220.

Figure 3:
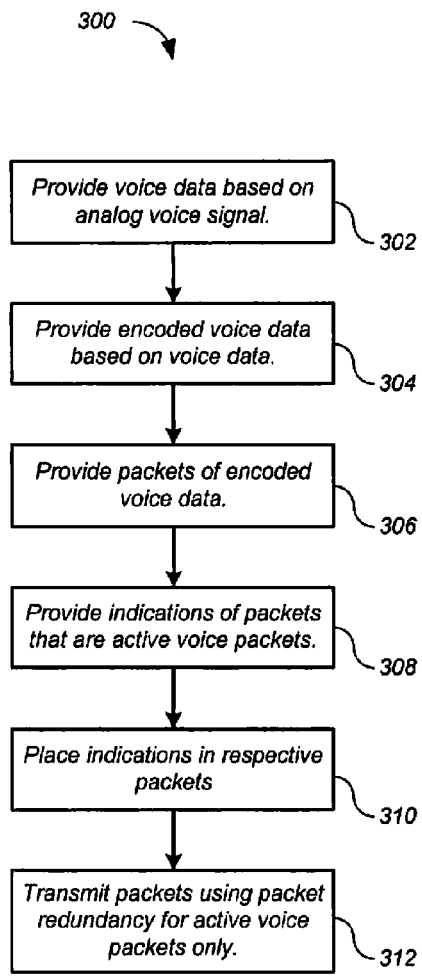
FIG. 3 shows a process for the network device of FIG. 2 according to some embodiments.

FIG. 3 shows a process 300 for network device 202 of FIG. 2 according to some embodiments. Although in the described embodiments, the elements of the disclosed processes are presented in one arrangement, other embodiments may feature other arrangements. For example, in various embodiments, some or all of the steps of the disclosed processes can be executed in a different order, concurrently, and the like.

Referring to FIGS. 2 and 3, at 302 modulator 220 provides voice data 124 based on an analog voice signal 122, which can be provided by a microphone or the like. At 304, encoder 218 provides encoded voice data 126 based on voice data 124. Any conventional modulation and encoding techniques can be used. Encoded voice data 126 includes intervals of voice activity and intervals of silence.

At 306, packet circuit 210 provides packets 128 of encoded voice data 126. Each packet 128 includes a packet sequence indicator. The packet sequence indicator can be a sequence number, timestamp, or the like. For example, packets 128 can be Real-time Transport Protocol (RTP) packets, each having a sequence number in the RTP header. Input circuit 108 receives packets 128.

At 308, voice activity detector 214 provides indications 130 of the packets 128 that are active voice packets, that is, the packets 128 that include one or more of the intervals of voice activity. For example, each indication 130 can be a flag or the like. At 310, voice activity flag circuit 216 places each indication 130 in the respective packet 128. In other embodiments, the flags are placed only in the active voice packets, or only in the silence packets.

At 312, packet circuit 212 transmits the packets 128 using packet redundancy for the active voice packets only. That is, packet circuit 212 transmits two or more of each packet 128 that includes an interval of voice activity, but only one of each packet 128 that includes only intervals of silence (that is, no intervals of voice activity). Packet circuit 212 employs indications 130 to identify the active voice packets 128. In some embodiments, packets 128 are encapsulated into packets 132 prior to transmission, for example using User Datagram Protocol (UDP) or the like.

The interval between transmission of redundant packets 128 (for example, between transmission of an active voice packet 128 and a copy of that packet 128) can be selected according to any technique. For example, the interval can be selected based on packet type, packet duration, network type, traffic type, receive jitter buffer depth, and the like. Table 1 shows example parameters for transmission of packets 128 using RTP over UDP based on packet duration and network type.

TABLE 1

| Network Type | Frame Duration | Redundant Packet Transmit Interval |
|---|---|---|
| Wired (LAN or WAN) | 10 ms | 5 to 8 ms |
| | 20 ms | 8 to 16 ms |
| | 30 ms | 16 to 22 ms |
| | 40 ms | 20 to 30 ms |
| Wireless (WLAN, WiMAX, or LTE) | 10 ms | 0-10 ms |
| | 20 ms | 10-20 ms |
| | 30 ms | 10-20 ms |
| | 40 ms | 10-30 ms |

Figure 4:
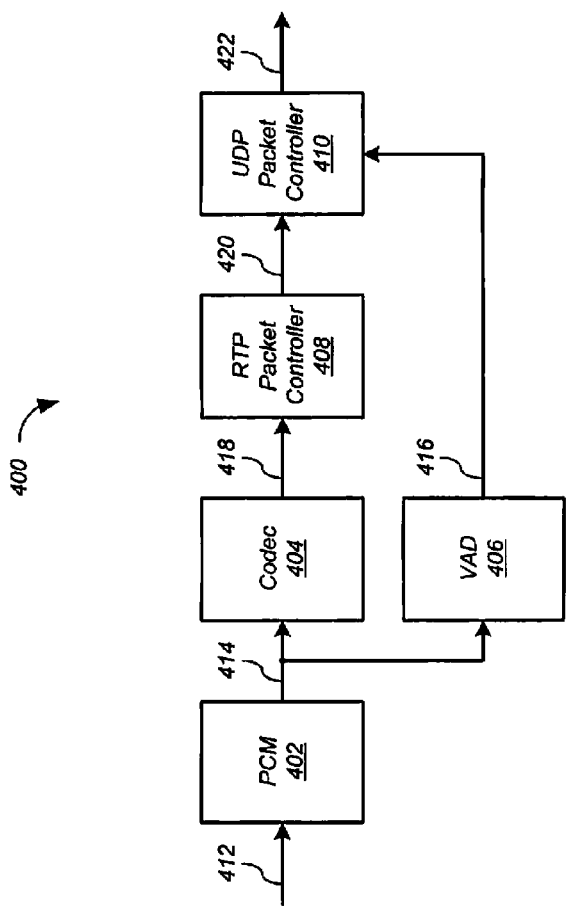
FIGS. 4-6 show various example embodiments.
Figure 5:
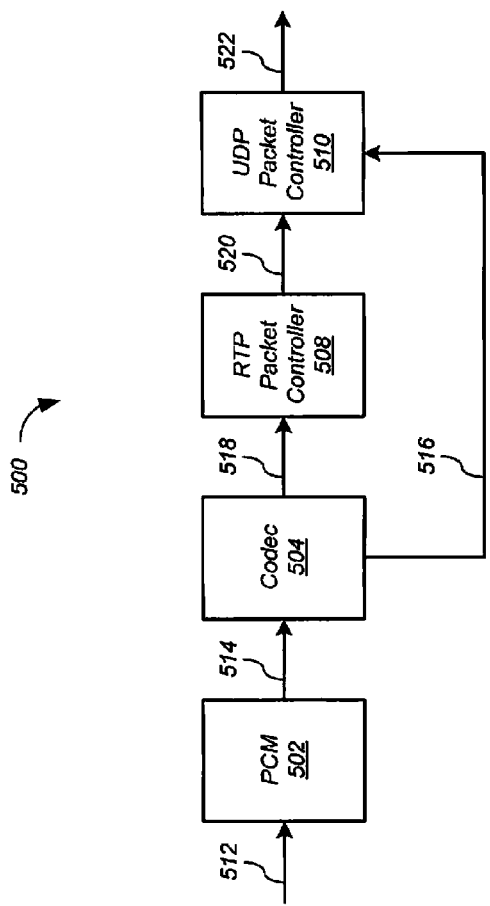
Figure 6:
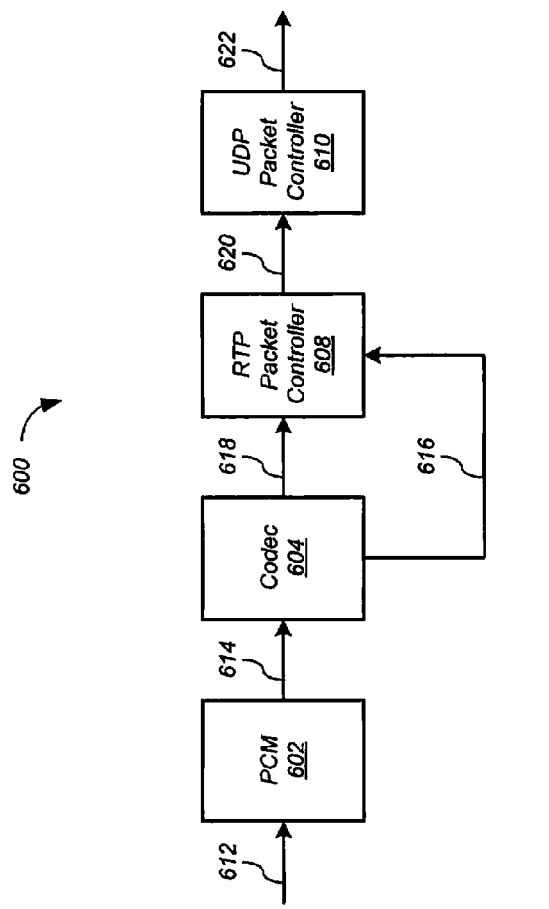

FIGS. 4-6 show various example embodiments. FIG. 4 shows an embodiment 400 including a codec that does not support voice activity detection. Referring to FIG. 4, embodiment 400 includes a pulse code modulator (PCM) 402, a codec 404, a voice activity detector (VAD) 406, an RTP packet controller 408, and a UDP packet controller 410. Based on an analog voice signal 412, PCM 402 provides a digital voice signal 414, which is provided to codec 404 and VAD 406. VAD 406 provides voice activity flags 416 that indicate intervals of silence and voice activity in digital voice signal 414.

Codec 404 provides encoded voice data 418 based on digital voice signal 414. RTP packet controller 408 provides RTP packets 420 of the encoded voice data. Each RTP packet 420 includes an RTP header bearing a packet sequence number. UDP packet controller 410 transmits UDP packets 422 based on RTP packets 420 and voice activity flags 416. In particular, UDP packet controller 410 transmits two or more of each UDP packet 422 that includes an interval of voice activity, but only one of each UDP packet 422 that includes only intervals of silence (that is, no intervals of voice activity).

FIG. 5 shows an embodiment 500 including a codec that supports voice activity detection. Referring to FIG. 5, embodiment 500 includes a pulse code modulator (PCM) 502, a codec 504, an RTP packet controller 508, and a UDP packet controller 510. Based on an analog voice signal 512, PCM 502 provides a digital voice signal 514, which is provided to codec 504. Codec 504 provides voice activity flags 516 that indicate intervals of silence and voice activity in digital voice signal 514.

Codec 504 provides encoded voice data 518 based on digital voice signal 514. RTP packet controller 508 provides RTP packets 520 of the encoded voice data. Each RTP packet 520 includes an RTP header bearing a packet sequence number. UDP packet controller 510 transmits UDP packets 522 based on RTP packets 520 and voice activity flags 516. In particular, UDP packet controller 510 transmits two or more of each UDP packet 522 that includes an interval of voice activity, but only one of each UDP packet 522 that includes only intervals of silence (that is, no intervals of voice activity).

FIG. 6 shows an embodiment 600 including a codec that supports voice activity detection and places voice activity flags in RTP packet headers. Referring to FIG. 6, embodiment 600 includes a pulse code modulator (PCM) 602, a codec 604, an RTP packet controller 608, and a UDP packet controller 610. Based on an analog voice signal 612, PCM 602 provides a digital voice signal 614, which is provided to codec 604. Codec 604 provides voice activity flags 616 that indicate intervals of silence and voice activity in digital voice signal 614.

Codec 604 provides encoded voice data 618 based on digital voice signal 614. RTP packet controller 608 provides RTP packets 620 of the encoded voice data. Each RTP packet 620 includes an RTP header bearing a packet sequence number. RTP packet controller 608 also places a voice activity flag 616 in each RTP packet 620.

UDP packet controller 610 transmits UDP packets 622 based on RTP packets 620 and the voice activity flags 616 placed in RTP packets 620. In particular, UDP packet controller 610 transmits two or more of each UDP packet 622 that includes an interval of voice activity, but only one of each UDP packet 622 that includes only intervals of silence (that is, no intervals of voice activity).

Various embodiments can be implemented in digital electronic circuitry, or in computer hardware, firmware, software, or in combinations of them. Embodiments can be implemented in a computer program product tangibly embodied in a machine-readable storage device for execution by a programmable processor; and method steps can be performed by a programmable processor executing a program of instructions to perform functions by operating on input data and generating output. Embodiments can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the scope of the disclosure. Accordingly, other implementations are within the scope of the following claims.

What is claimed is:

1. A network device comprising:
   a receiving device configured to receive a first signal, wherein the first signal includes a plurality of packets, wherein the plurality of packets include a plurality of first packets and a plurality of second packets, wherein the plurality of first packets correspond to intervals of the first signal containing voice activity, and wherein the plurality of second packets correspond to intervals of the first signal not containing voice activity;
   a detector configured to (i) detect the plurality of first packets in the first signal that correspond to the intervals of the first signal containing the voice activity, and (ii) generate an indication signal identifying the plurality of first packets that correspond to the intervals of the first signal containing the voice activity; and
   a first circuit configured to, based on the indication signal, insert a bit in either (i) each of the plurality of first packets and not the plurality of second packets, or (ii) each of the plurality of second packets and not the plurality of first packets, wherein the bit inserted into each of the plurality of first packets or the plurality of second packets indicates which of the plurality of packets in the first signal correspond to intervals of the first signal containing voice activity.

2. The network device of claim 1, further comprising a second circuit configured to:
   receive the plurality of packets, wherein each of the plurality of packets in the first signal includes a sequence indicator, and wherein the sequence indicators indicate an order of the plurality of packets in the first signal; and
   based on the sequence indicators, (i) transmit two or more of each of the first plurality of packets, and (ii) only one of each of the second plurality of packets.

3. The network device of claim 1, wherein:
the receiving device is configured to encode the first signal; and
the detector is configured to receive the encoded first signal.

4. The network device of claim 3, further comprising a modulator configured to (i) receive an analog signal from a microphone, and (ii) modulate the analog signal to generate the first signal encoded by the receiving device.

5. The network device of claim 1, wherein the plurality of packets in the first signal are real-time transport protocol packets.

6. The network device of claim 1, wherein the first circuit is configured to insert a respective one of the bits in each of the plurality of first packets and not in each of the plurality of second packets.

7. The network device of claim 1, wherein the first circuit is configured to insert a respective one of the bits in each of the plurality of second packets and not in each of the plurality of first packets.

8. The network device of claim 1, further comprising a second circuit, wherein:
the first circuit is configured to generate real-time transport protocol packets based on an output of the receiving device;
the receiving device is configured to encode the first signal to generate the output; and
the second circuit is configured to generate user datagram protocol packets based on (i) the real-time transport protocol packets, and (ii) the indication signal.

9. The network device of claim 8, wherein the detector is separate from the receiving device.

10. The network device of claim 1, further comprising a second circuit, wherein:
the first circuit is configured to generate real-time transport protocol packets based on (i) an output of the receiving device, and (ii) the indication signal;
the receiving device is configured to encode the first signal to generate the output; and
the second circuit is configured to generate user datagram protocol packets based on the real-time transport protocol packets.

11. The network device of claim 10, wherein the receiving device includes the detector.

12. A method comprising:
receiving a first signal, wherein the first signal includes a plurality of packets, wherein the plurality of packets include a plurality of first packets and a plurality of second packets, wherein the plurality of first packets correspond to intervals of the first signal containing voice activity, and wherein the plurality of second packets correspond to intervals of the first signal not containing voice activity;
detecting the plurality of first packets in the first signal that correspond to the intervals of the first signal containing the voice activity;
generating an indication signal identifying the plurality of first packets that correspond to the intervals of the first signal containing the voice activity; and
based on the indication signal, inserting a bit in either (i) each of the plurality of first packets and not the plurality of second packets, or (ii) each of the second packets and not the first packets, wherein the bit inserted into each of the plurality of first packets or the plurality of second packets indicates which of the plurality of packets in the first signal correspond to intervals of the first signal containing voice activity.

13. The method of claim 12, further comprising:
receiving the plurality of packets in the first signal, wherein each of the plurality of packets in the first signal includes a sequence indicator, and wherein the sequence indicators indicate an order of the plurality of packets in the first signal; and
based on the sequence indicators, (i) transmitting two or more of each of the plurality of first packets, and (ii) only one of each of the plurality of second packets.

14. The method of claim 12, further comprising:
encoding the first signal prior to detecting which of the plurality of packets in the first signal include the voice data;
receiving an analog signal from a microphone; and
modulating the analog signal to generate the first signal encoded by the receiving device.

15. The method of claim 12, wherein the plurality of packets in the first signal are real-time transport protocol packets.

16. The method of claim 12, comprising inserting a respective one of the bits in each of the plurality of first packets and not in each of the plurality of second packets.

17. The method of claim 12, comprising inserting a respective one of the bits in each of the plurality of second packets and not in each of the plurality of first packets.

18. The method of claim 12, further comprising:
generating real-time transport protocol packets based on an output of a receiving device, wherein the first signal is received at the receiving device;
encoding, via the receiving device, the first signal to generate the output; and
generating user datagram protocol packets based on (i) the real-time transport protocol packets, and (ii) the indication signal.

19. The method of claim 12, further comprising:
generating real-time transport protocol packets based on (i) an output of a receiving device, and (ii) the indication signal, wherein the first signal is received at the receiving device;
encoding, via the receiving device, the first signal to generate the output; and
generating user datagram protocol packets based on the real-time transport protocol packets.

20. A network device comprising:
a receiving device configured to receive a first signal, wherein the first signal includes a plurality of packets, wherein the plurality of packets include first packets and second packets, wherein the first packets correspond to intervals of the first signal with voice data, and wherein the second packets correspond to intervals of the first signal without voice data;
a detector configured to (i) detect which of the plurality of packets in the first signal include the voice data, and (ii) generate an indication signal identifying the first packets as packets with the voice data; and
a first circuit configured to, based on the indication signal, insert a bit in either (i) each of the first packets and not the second packets, or (ii) each of the second packets and not the first packets, wherein the bits indicate which of the plurality of packets include the voice data.

21. The network device of claim 1, further comprising a second circuit, wherein:
the first packets are real-time transport protocol packets and include the inserted bits;
the first packets, due to the inserted bits, include more bits than the second packets;

the first circuit is configured to transmit to the second circuit (i) the first packets including the inserted bits, and (ii) the second packets; and the first circuit, based on packet redundancy, is configured to transmit to the second circuit (i) two of each of the first packets, and (ii) one of each of the second packets.

22. The network device of claim 21, wherein the second circuit is configured to (i) determine that the first packets have voice activity based on the inserted bits, (ii) encapsulate the first packets and the second packets into respective third packets, and (iii) transmit the third packets from the network device.

23. The network device of claim 1, further comprising a second circuit, wherein:

the second packets are real-time transport protocol packets and include the inserted bits;

the second packets, due to the inserted bits, include more bits than the first packets;

the first circuit is configured to transmit to the second circuit (i) the first packets, and (ii) the second packets including the inserted bits; and the first circuit, based on packet redundancy, is configured to transmit to the second circuit (i) two of each of the first packets, and (ii) one of each of the second packets.

24. The network device of claim 23, wherein the second circuit is configured to (i) determine that the second packets do not have voice activity based on the inserted bits, (ii) encapsulate the first packets and the second packets into respective third packets, and (iii) transmit the third packets from the network device.

* * * * *